(12) United States Patent
Eilken et al.

(10) Patent No.: US 10,486,789 B2
(45) Date of Patent: Nov. 26, 2019

(54) FUSELAGE STRUCTURE AND METHOD FOR MANUFACTURING A FUSELAGE STRUCTURE

(71) Applicant: Airbus Operations GmbH, Hamburg (DE)

(72) Inventors: Wolfgang Eilken, Hamburg (DE); Memis Tiryaki, Hamburg (DE); Anton Arosenko, Hamburg (DE)

(73) Assignee: Airbus Operations GmbH (DE)

( * ) Notice: Subject to any disclaimer, the term of this patent is extended or adjusted under 35 U.S.C. 154(b) by 451 days.

(21) Appl. No.: 15/203,948

(22) Filed: Jul. 7, 2016

(65) Prior Publication Data
US 2017/0008607 A1    Jan. 12, 2017

(30) Foreign Application Priority Data
Jul. 9, 2015    (DE) .......................... 10 2015 111 160

(51) Int. Cl.
*B64C 1/10*    (2006.01)
*B64C 1/06*    (2006.01)
(52) U.S. Cl.
CPC ................ *B64C 1/10* (2013.01); *B64C 1/061* (2013.01); *B64C 1/064* (2013.01); *B64C 1/065* (2013.01)
(58) Field of Classification Search
CPC ............ B64C 1/10; B64C 1/065; B64C 1/061
See application file for complete search history.

(56) References Cited

U.S. PATENT DOCUMENTS

| 1,669,592 | A | * | 5/1928 | Arnstein | ................... | B64B 1/00 |
| | | | | | | 244/125 |
| 2,132,529 | A | * | 10/1938 | Firner | ..................... | B64C 1/061 |
| | | | | | | 244/108 |
| 5,062,589 | A | * | 11/1991 | Roth | ........................ | B64C 1/10 |
| | | | | | | 244/117 R |
| 5,899,412 | A | * | 5/1999 | Dilorio | ..................... | B64C 1/10 |
| | | | | | | 244/119 |
| 6,213,426 | B1 | * | 4/2001 | Weber | ....................... | B64C 1/10 |
| | | | | | | 244/117 R |

(Continued)

FOREIGN PATENT DOCUMENTS

DE    10 2007 052 140 A1    5/2009
DE    10 2007 044 388 B4    8/2012
(Continued)

OTHER PUBLICATIONS

German Search Report dated Jan. 28, 2016.

*Primary Examiner* — Brian M O'Hara
*Assistant Examiner* — Keith L Dixon
(74) *Attorney, Agent, or Firm* — Lerner, David, Littenberg, Krumholz & Mentlik, LLP (57) ABSTRACT

A fuselage structure includes a pressure bulkhead and a frame being arranged behind the pressure bulkhead. The fuselage structure includes a first beam element with a first cantilever and a second cantilever, while the first beam element extends in a vertical direction of the fuselage structure. The first cantilever and the second cantilever protrude from the first beam element in a first direction toward the frame. The first direction of both cantilevers is inclined at a first angle with respect to a longitudinal direction of the fuselage structure. An aircraft with a fuselage structure and a method for manufacturing a fuselage structure are also described.

18 Claims, 4 Drawing Sheets

(56) References Cited

U.S. PATENT DOCUMENTS

| | | | | |
|---|---|---|---|---|
| 6,478,254 B2* | 11/2002 | Matsui | ...................... | B64C 1/10 |
| | | | | 244/119 |
| 8,226,870 B2* | 7/2012 | Garcia Laja | .............. | B64C 1/10 |
| | | | | 264/238 |
| 8,444,089 B2 | 5/2013 | Mischereit et al. | | |
| 8,596,578 B2* | 12/2013 | Noebel | ..................... | B64C 1/10 |
| | | | | 220/609 |
| 8,777,160 B2* | 7/2014 | Dazet | ......................... | B64C 1/10 |
| | | | | 244/117 R |
| 2011/0233334 A1 | 9/2011 | Stephan | | |
| 2011/0290940 A1 | 12/2011 | Noebel et al. | | |
| 2015/0166167 A1 | 6/2015 | Kies | | |

FOREIGN PATENT DOCUMENTS

| | | |
|---|---|---|
| DE | 10 2013 114 391 A1 | 6/2015 |
| WO | 2013139716 A1 | 9/2013 |

* cited by examiner

FUSELAGE STRUCTURE AND METHOD FOR MANUFACTURING A FUSELAGE STRUCTURE

FIELD OF THE INVENTION

The description relates to assembly of fuselage structures for vehicles. In particular, the description relates to a fuselage structure, an aircraft with a fuselage structure, and a method for manufacturing a fuselage structure.

BACKGROUND OF THE INVENTION

In modern commercial aircraft, it is required that a determined pressure level is maintained in the interior of the passenger cabin. This so called cabin pressure substantially differs from the ambient pressure, in particular during flight, so that the fuselage structure of the aircraft is adapted by design features as to separate regions of different pressure from each other. For this purpose, pressure bulkheads are mounted within the fuselage structure, wherein the pressure bulkheads separate these regions of different pressure. Such pressure bulkheads comprise a structure of a sphere-shell-like manner, for example, as to introduce pressure loads effectively into the fuselage structure of the aircraft.

US 2011/0290940 A1 describes a pressure bulkhead for an aircraft fuselage, wherein the pressure bulkhead comprises a flat skin which extends across a cross section of the fuselage and which comprises a cavity in a core region of the skin.

WO 2013/139716 A1 describes a pressure bulkhead for an aircraft. Here, the pressure bulkhead is arranged in a fuselage shell. The pressure bulkhead comprises a lenticular cross section as well as a sandwich construction with a foam core.

BRIEF SUMMARY OF THE INVENTION

There may be a need to increase the cabin space in a vehicle.

According to an aspect, a fuselage structure is indicated. The fuselage structure comprises a pressure bulkhead, a frame arranged behind the pressure bulkhead, as well as a first beam element with a first cantilever and a second cantilever. Here, the first beam element extends in a vertical direction of the fuselage structure. The first cantilever and the second cantilever protrude from the first beam element in a first direction towards the frame. This first direction of the two cantilevers is arranged inclined at a first angle relative to a longitudinal direction of the fuselage structure, for example in a top view onto the fuselage structure.

It is possible to effectively transmit a pressure load applied to the pressure bulkhead into the fuselage structure by such a fuselage structure. It is possible, in particular, to design the pressure bulkhead such that space within a cabin of the fuselage structure is saved. Thereby, the fuselage structure is part of a fuselage of an aircraft, for example, in particular part of an air plane. Hence, the pressure bulkhead serves for separation of regions of different pressure within the fuselage structure. For example, the region within the passenger cabin, which passenger cabin may be part of the fuselage structure, has another pressure as the surroundings of the passenger cabin.

The pressure bulkhead comprises an even, flat, curved, or sphere-shell-like manner or sphere-calotte-like manner structure. However, the pressure bulkhead is preferably designed even or flat. Thus, additional space within the passenger cabin can be saved as the pressure bulkhead can be shifted toward a rear part or tail of the aircraft without occurrence of overlapping components between the pressure bulkhead and other structural components being arranged in the tail of the aircraft. As to be able to introduce the pressure loads applied to the pressure bulkhead, which is being designed even, for example, into the fuselage structure, the first beam element with the first cantilever and the second cantilever is mounted to the pressure bulkhead. Thereby, the first beam element is mounted by means of cross-bracings attached to the pressure bulkhead. For example, these cross-bracings extend on the surface of the pressure bulkhead in a horizontal direction perpendicular to the longitudinal direction and/or perpendicular to the vertical direction.

Anyway, the first beam element extends in the vertical direction of the fuselage structure. The first beam element may be an elongated element which is of a flat or plate-shaped or disc-shaped structure, too. This will be elucidated in more detail in the description of the drawings.

The first beam element comprises two cantilevers which protrude from the first beam element in the first direction, in particular laterally. Thereby, the two cantilevers protrude substantially perpendicular from the elongated first beam element. The first and the second cantilever may be oriented, for example, substantially in a direction of the tail of the fuselage structure or of the aircraft. In particular, the first direction of the two cantilevers is inclined at the first angle relative to the longitudinal direction of the fuselage structure or of the aircraft. The two cantilevers are both oriented in the first direction and, thus, point in the same direction. The first direction and the longitudinal direction confine the first angle, wherein the first angle is measured in a top view onto the fuselage structure or the aircraft. Thus, it is possible that the first direction is inclined at a defined angle with respect to the longitudinal axis or a middle axis of the aircraft or points away from the same. This relation will be elucidated in more detail in the description of the drawings. More than two cantilevers may be provided at the beam element, wherein the cantilevers protrude from the beam element in the first direction.

The pressure bulkhead is arranged in the region of a first frame, for example. Within the fuselage structure, the pressure bulkhead is supported by the first beam element in connection with the two cantilevers, for example, so that pressure loads which are applied to the pressure bulkhead are effectively introduced into the fuselage structure. The cantilevers extend along two frame spacings within the fuselage structure, for example, wherein the frames are arranged in longitudinal direction of the fuselage structure one after another, respectively. Furthermore, it is possible that the two cantilevers are mounted, in turn, to an additional frame and, thus, introduce the pressure loads applied to the pressure bulkhead in the fuselage structure via this additional frame. In a side view, the cantilevers may have tapered shape, in particular in direction of the tail of the aircraft.

According to an embodiment, the first cantilever is arranged at a first end of the first beam element and the second cantilever is arranged at a second end of the first beam element.

The first beam element is an elongated component, for example, at the first end of which the first cantilever protrudes substantially perpendicularly, i.e., laterally from the elongated beam element, and at the second end of which the second cantilever protrudes substantially perpendicularly, i.e., laterally from the elongated beam element. Thereby, the first beam element as well as the two cantilevers may be shaped flat or may have a plate-shaped or disc-shaped structure. Thus, weight can be saved additionally and, at the same time, a reliable transmission of loads being applied to the pressure bulkhead into the fuselage structure can be ensured.

According to a further embodiment, the first angle is arranged in a horizontal plane which is oriented perpendicularly with respect to the vertical direction.

For example, the horizontal plane is spanned by a plane which lies perpendicular with respect to the vertical direction or which is spanned by a horizontal direction and the longitudinal direction of the fuselage structure. The horizontal direction, the vertical direction and the longitudinal direction of the fuselage structure may, in particular, form a right-handed system. Thus, the first angle is measured in a top view onto the fuselage structure, for example, wherein the top view is defined by a viewing direction in the vertical direction. In particular, this first angle describes the inclination of the first direction with respect to the longitudinal direction of the fuselage structure, along which first direction the two cantilevers extend or protrude from the first beam element. The longitudinal direction may also be referred to as longitudinal axis.

According to a further embodiment, the first direction and/or the longitudinal direction lie in the horizontal plane.

Thus, the first cantilever as well as the second cantilever protrude substantially or exactly perpendicularly from the elongated first beam element which itself extends in the vertical direction. The cantilevers may protrude from the first beam element as projections, protrusions or bulges, for example. For example, the first cantilever and the second cantilever point in the first direction so that both cantilevers protrude parallel from the first beam element.

According to a further embodiment, the pressure bulkhead is shaped evenly.

Thus, additional space within the passenger cabin can be saved as the pressure bulkhead, contrary to conventional sphere-shell-like manner pressure bulkheads, can be shifted toward the tail of the fuselage structure or of the aircraft. The even or flat pressure bulkhead can thus be oriented substantially perpendicularly with respect to the longitudinal direction of the fuselage structure. In particular, the even pressure bulkhead is attached to the fuselage structure in the region of a frame of the fuselage structure.

According to a further embodiment, the first cantilever and the second cantilever are connected to each other with a connection element which is spaced apart from the first beam element. Thereby, the connection element extends in the vertical direction parallel to the first beam element.

The connection element can be designed as a component in a beam-like manner. The connection element extends in the vertical direction in the region of an additional frame, for example, and/or is connected with this additional frame, for example.

According to a further embodiment, a stiffening element is affixed at the pressure bulkhead, which stiffening element extends in a horizontal direction.

This horizontal direction is the horizontal direction already described above, for example, which horizontal direction is oriented perpendicular with respect to the longitudinal direction and/or perpendicular with respect to the vertical direction of the fuselage structure. Thus, the horizontal direction and the longitudinal direction span a horizontal plane in which the first angle lies. For example, the stiffening element is arranged on a surface of the pressure bulkhead, which surface is facing away from the passenger cabin and is, thus, facing towards the tail of the aircraft. For example, the stiffening element is a rib-like element which causes a stiffening of the even pressure bulkhead so that a secure reception of the pressure loads affecting the pressure bulkhead is ensured. These pressure loads are transmitted to the first beam element via the stiffening element.

According to a further embodiment, the fuselage structure further comprises a multitude of stiffening elements which extend on a surface of the pressure bulkhead parallel to each other in the horizontal direction.

For example, the surface is the surface of the pressure bulkhead already described above, which surface is facing away from the passenger cabin. Thus, the stiffening elements altogether form a rib-like structure which stiffens the pressure bulkhead so that pressure loads which affect the pressure bulkhead can be effectively received. However, it is also possible that the multitude of stiffening elements extend in a direction inclined with respect to the horizontal direction. However, the stiffening elements are preferably arranged in the horizontal or vertical direction. The first beam element may be in direct contact with the stiffening elements. The first beam element may be mounted to the pressure bulkhead with the stiffening elements or directly.

According to a further embodiment, the pressure bulkhead is mounted to the fuselage structure in the region of a frame and separates, within the fuselage structure, two regions of different pressure from each other.

For example, the pressure bulkhead separates a region with a cabin pressure and a region with an ambient pressure from each other. Thereby, the cabin pressure and the ambient pressure are of different values, in particular during a flight of the aircraft. Thus, pressure loads which are caused by the pressure difference between the cabin and the surroundings are introduced into the fuselage structure by the pressure bulkhead. In particular, such pressure loads are introduced into a further frame and, subsequently, into the fuselage structure via the frame or via the first beam element and the two cantilevers.

According to a further embodiment, the fuselage structure further comprises a second beam element with a first cantilever and a second cantilever, wherein the second beam element extends in the vertical direction of the fuselage structure. Thereby, the first cantilever and the second cantilever protrude from the second beam element in a second direction towards the frame. The second direction of the two cantilevers is arranged in an inclined manner at a second angle with respect to the longitudinal direction of the fuselage structure.

It is possible that the second angle also lies in the horizontal plane and, thereby, is measured in a top view onto the fuselage structure or the aircraft, for example. Further, it is possible that the first cantilever and the second cantilever of the second beam element protrude from this second element in direction of the same frame towards which the two cantilevers of the first beam element protrude from the first beam element. In the top view, the first direction and the second direction are arranged, for example, symmetric with respect to the longitudinal direction. Thus, the first angle and the second angle may be the same size. The pressure bulkhead may be supported even better with respect to the fuselage structure due to the arrangement of the second beam element additionally to the first beam element. This enables to efficiently introduce pressure loads which affect the pressure bulkhead into the fuselage structure.

According to a further embodiment, the second direction of the two cantilevers of the second beam element and the first direction of the two cantilevers of the first beam element lie in a horizontal plane and/or confine an acute angle.

The horizontal plane is the horizontal plane already described above, for example, which horizontal plane is spanned by the longitudinal direction of the fuselage structure and the horizontal direction and which is oriented perpendicular to the vertical direction. The first angle as well as the second angle may be an acute angle, respectively. Further, it is possible that the sum of the first angle and the second angle form an acute angle.

According to a further embodiment, the first angle and the second angle are the same size.

Thus, a symmetric alignment of the respective cantilevers of the first beam element or the second beam element may be provided with respect to the longitudinal direction as to evenly introduce the load which affects the pressure bulkhead into the fuselage structure.

It is possible that the first or second beam element also extend in the horizontal direction or transverse direction of the fuselage structure or of the aircraft, so that the first end and the second end of the first beam element are arranged one after another in the horizontal direction. In particular, it is possible that the horizontal plane is aligned or oriented perpendicular to the horizontal direction. Thus, the first direction and the second direction, in which the respective cantilevers protrude from the first or second beam element, may lie in a plane which is spanned by the vertical direction and the longitudinal direction of the fuselage structure.

According to a further aspect, an aircraft is provided which comprises the fuselage structure described above.

The fuselage structure may, thus, be a part of the aircraft, for example. For example, the aircraft is an airplane, in particular a passenger plane or a freight plane.

According to an embodiment, the first direction of the two cantilevers of the first beam element and the longitudinal direction of the fuselage structure run divergent with decreasing distance to a tail of the aircraft.

This is the result of the inclined arrangement of the first direction of the two cantilevers with respect to the longitudinal direction of the fuselage structure, wherein the first angle is an acute angle, for example.

According to a further aspect, a method for manufacturing a fuselage structure is provided. In a step of the method, provision of a pressure bulkhead takes place. In a further step, arrangement of a frame behind the pressure bulkhead takes place. Furthermore, in an additional step of the method, provision of a first beam element with a first cantilever and a second cantilever takes place. Arrangement of the first beam takes place in an additional step such that this first beam element extends in a vertical direction of the fuselage structure. Alignment of the first cantilever and the second cantilever takes place in an additional step such that both cantilevers protrude from the first beam element in a first direction towards the frame while the first direction of the two cantilevers is arranged inclined at a first angle with respect to a longitudinal direction of the fuselage structure.

The steps of the method may be carried out in a different order. Furthermore, the method steps may also be applied to a second beam element.

DETAILED DESCRIPTION

The representations in the drawings are schematic and not to scale.

If in the following description of the drawings similar reference signs are used in different drawings, these refer to equal or similar elements. However, equal or similar elements may be referred to by different reference signs.

Figure 1:
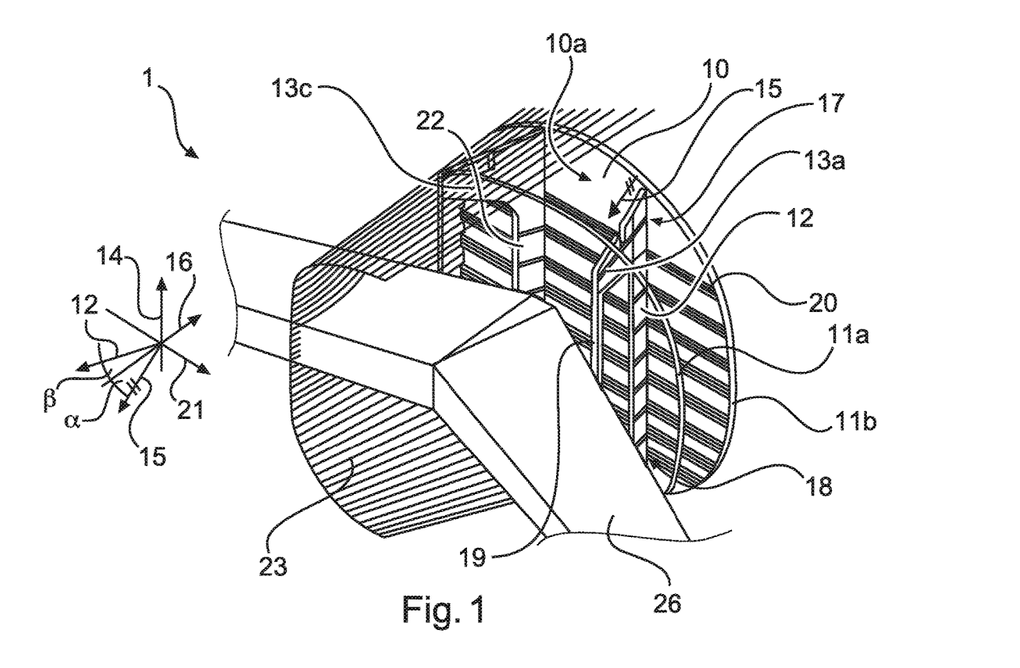
FIG. 1 shows a perspective view of a fuselage structure according to an exemplary embodiment.

FIG. 1 shows a fuselage structure 1 in a perspective view. The fuselage structure 1 comprises a pressure bulkhead 10 and a frame 11a being arranged behind the pressure bulkhead 10 in relation to a longitudinal axis 16. Furthermore, the fuselage structure 1 comprises a first beam element 12 with a first cantilever 13a and a second cantilever not shown in FIG. 1. The first beam element 12 extends in a vertical direction 14 of the fuselage structure 1. For example, the vertical direction 14 is arranged right-angled with respect to the longitudinal direction 16. The first cantilever 13a and the second cantilever 13b protrude from the first beam element 12 in a first direction 15 towards the frame 11a. The beam element 12 and/or the cantilevers 13a, 13b are formed in a disc-shaped manner or plate-shaped manner. The first direction 15 of the two cantilevers 13a, 13b is arranged inclined at a first angle α with respect to the longitudinal direction 16 of the fuselage structure 1.

Further, in FIG. 1 a part of the outer skin 23 of the fuselage structure 1 is shown, which outer skin extends along the direction of extension of the frame 11a. An empennage 26 is also depicted in FIG. 1 and is located, with respect to the longitudinal direction 16, completely behind the pressure bulkhead 10 and behind the first beam element 12 affixed at the pressure bulkhead 10. The first cantilever 13a is located at a first end 17 of the beam element 12, wherein the first cantilever 13a extends in the first direction 15. The second cantilever 13b of the first beam element 12 is located at a second end 18 of the first beam element 12, wherein the second cantilever 13b is not shown in FIG. 1. For example, this second cantilever 13b extends in the first direction 15, too. Thereby, the cantilevers 13a, 13b may also comprise beveled edges or irregular shapes and contours, so that the two cantilevers substantially extend in the first direction 15. Stiffening elements 20 are affixed at the pressure bulkhead 10 which has an even or flat shape, for example. These stiffening elements 20 may likewise be beam-like or rib-like elements which are arranged parallel to each other on a surface 10a of the pressure bulkhead 10. Thereby, the stiffening elements 20 extend on the surface 10a of the pressure bulkhead 10, for example parallel to a transverse direction or horizontal direction 21 of the fuselage structure 1. The fuselage structure 1 further comprises a second beam element 22 which likewise comprises a first cantilever 13c as well as a second cantilever not shown in FIG. 1. The first cantilever 13c and the second cantilever of the second beam element 22 protrude from the second beam element 22 in a second direction 24 and are, therefore, substantially aligned towards the frame 11a. The second beam element 22 likewise extends in the vertical direction 14 and the second direction 24 of the first cantilever 13c and the second cantilever of the second beam element 22 is arranged in an inclined manner at a second angle β with respect to the longitudinal direction 16 of the fuselage structure 1.

The first angle α or the second angle β lie in a horizontal plane, for example, wherein the horizontal plane is spanned by the horizontal direction 21 and the longitudinal direction 16. Consequently, the horizontal plane is arranged perpendicular with respect to the vertical direction 14. The first angle α and the second angle β may be of same size. Furthermore, the first direction 15 and the second direction 24, respectively, may confine an acute angle with the longitudinal direction 16. It is further possible that the first direction 15 and the second direction 24 together also confine an acute angle. The first angle α and/or the second angle β are smaller than 45°, for example. Preferably, each of the first angle α and/or the second angle β are between 25° and 35°. According to an example, the first angle α and the second angle β are substantially or exactly 30°.

Figure 2:
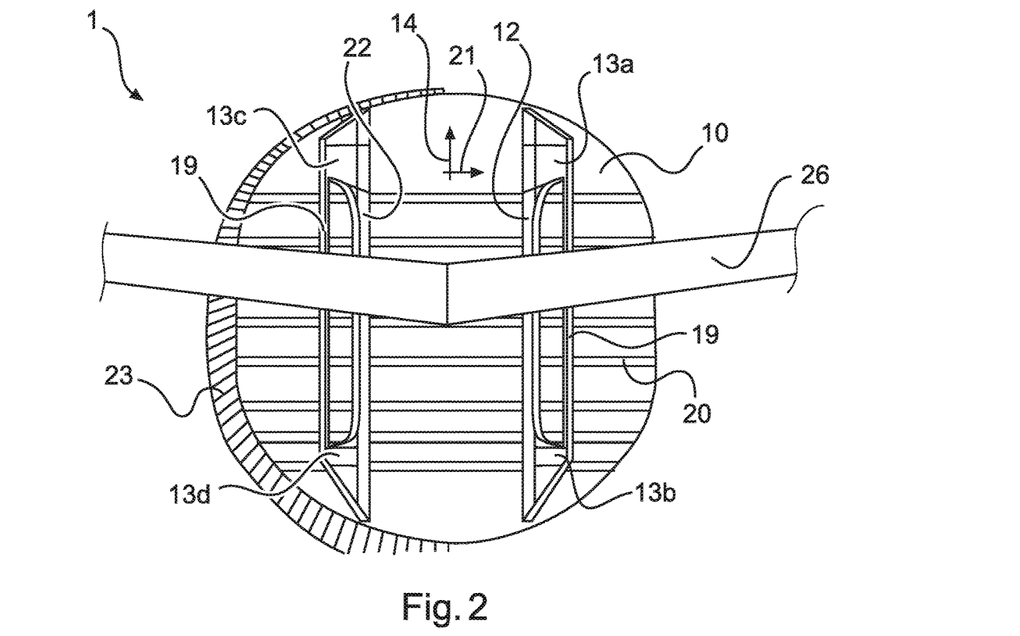
FIG. 2 shows a rear view of a fuselage structure according to an exemplary embodiment.

FIG. 2 shows a rear view of the fuselage structure 1. The pressure bulkhead 10 as well as the stiffening elements 20 extending on the surface 10a of the pressure bulkhead can be recognized, wherein the stiffening elements 20 extend parallel to the horizontal direction 21 of the fuselage structure. Further, the empennage 26 is shown, which is located behind the pressure bulkhead 10 with respect to the longitudinal direction 16. Further, as also delineated in FIG. 1, a connection element 19 is shown which interconnects the cantilevers 13a, 13b of the first beam element 12. An additional connection element 19 interconnects the two cantilevers 13c, 13d of the second beam element 22. Thereby, the two connection elements 19 and the frame 11a are arranged substantially in a plane. The connection elements 19 are located in the region of the empennage 26 which is the empennage 26 of an aircraft, for example. Further, in FIG. 2 a part of the outer skin 23 is depicted which huddles against an outer contour of the pressure bulkhead 10. For example, the pressure bulkhead 10 is designed even or flat and lies in a vertical plane which is spanned by the vertical direction 14 and the horizontal direction 21.

Figure 3:
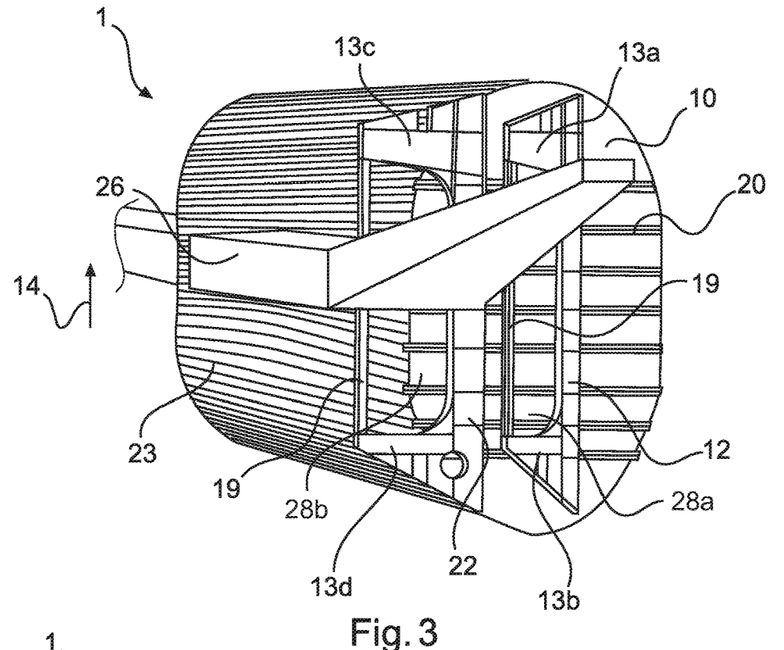
FIG. 3 shows a perspective view of a fuselage structure according to a further exemplary embodiment.

FIG. 3 shows a fuselage structure 1 in a perspective view, too. The first beam element 12 and the second beam element 22 as well as the connection elements 19 extend in the vertical direction 14. A recess 28a may be provided between the first beam element 12 and the connection element 19, which recess is delimited by the connection element 19, the two cantilevers 13a, 13b, and the first beam element 12. Likewise, a recess 28b may be provided between the second beam element 22 and the connection element 19, which recess is delimited by the connection element 19, the two cantilevers 13c, 13b of the second beam element 22, and the second beam element 22 itself. The fuselage structure 1 may comprise further components which are not depicted in the shown drawings. For example, these are cable lines, hydraulic lines or other structural components.

Figure 4:
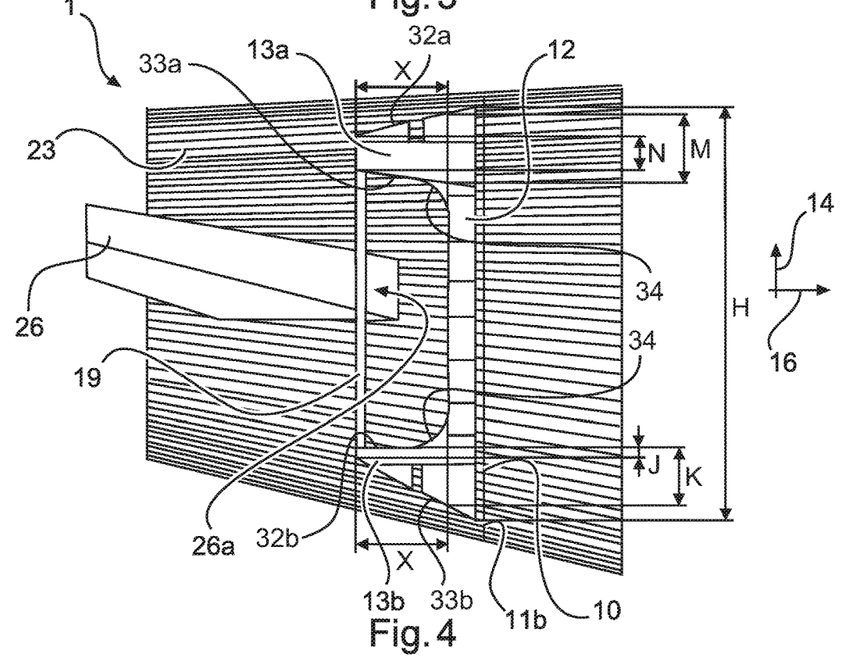
FIG. 4 shows a side view of a fuselage structure according to an exemplary embodiment.

FIG. 4 shows a side view of a fuselage structure 1, wherein it can be seen that the connection element 19 interconnects the two cantilevers 13a, 13b of the first beam element 12 and is arranged behind a front edge 26a of the empennage 26 with respect to the longitudinal axis 16. The frame 11a is arranged in the region of the connection element 19, wherein the cantilevers 13a, 13b of the first beam element 12 extend towards this frame. Furthermore, an additional frame 11b is provided which is located in the region of the pressure bulkhead 10. The first beam element 12 and the connection element 19 extend in the vertical direction 14 and/or perpendicular to the longitudinal direction 16. Further, in FIG. 4 a part of the outer skin 23 of the fuselage structure 1 is shown. The transition from the first or second beam element to the respective cantilevers may have a radius 34, for example for an optimized flow of forces or loads.

The beam element 12 has a height H which is measured parallel to the vertical direction 14. The first cantilever 13a has an upper edge 32a which, in the side view, is arranged at an angle of inclination of 14° with respect to the horizontal plane. Furthermore, the first cantilever 13a comprises a lower edge 33a which, in the side view, is arranged at an angle of inclination of 9° with respect to the horizontal plane. Hence, both edges 32a, 33a of the first cantilever 13a are inclined with respect to the horizontal plane. A maximum vertical extension M of the first cantilever 13a with respect to the vertical direction 14 is about one sixth of the height H of the beam element 12. A minimum vertical extension N of the first cantilever 13a with respect to the vertical direction 14 is about one tenth of the height H of the beam element 12. The transition from the maximum vertical extension M to the minimum vertical extension N of the first cantilever 13a is achieved by a continuous tapering of the first cantilever 13a in the first direction 15.

The second cantilever 13b has an upper edge 32b which arranged with respect to the horizontal plane at an angle of 0°, i.e., it is not inclined. Further, the second cantilever 13b has a lower edge 33b which is arranged at an angle of inclination of about 29° with respect to the horizontal plane. Hence, only the lower edge 33b of the second cantilever 13b is inclined with respect to the horizontal plane. A maximum vertical extension K of the second cantilever 13b with respect to the vertical direction 14 is about one seventh of the height H of the beam element 12. A minimum vertical extension J of the second cantilever 13b with respect to the vertical direction 14 is about one thirtieth of the height H of the beam element 12. The transition from the maximum vertical extension K to the minimum vertical extension J of the second cantilever 13b is achieved by a continuous tapering of the second cantilever 13b in the first direction 15. In the side view, the length X of the two cantilevers 13a, 13b is about one fifth of the height H of the beam element 12. Thereby, it is to be taken into account that these dimensions or angles may be projected dimensions or angles, as the cantilevers 13a, 13b protrude from the image plane of FIG. 4 in an inclined manner. This is pointed out in the top view shown in FIG. 5.

Figure 5:
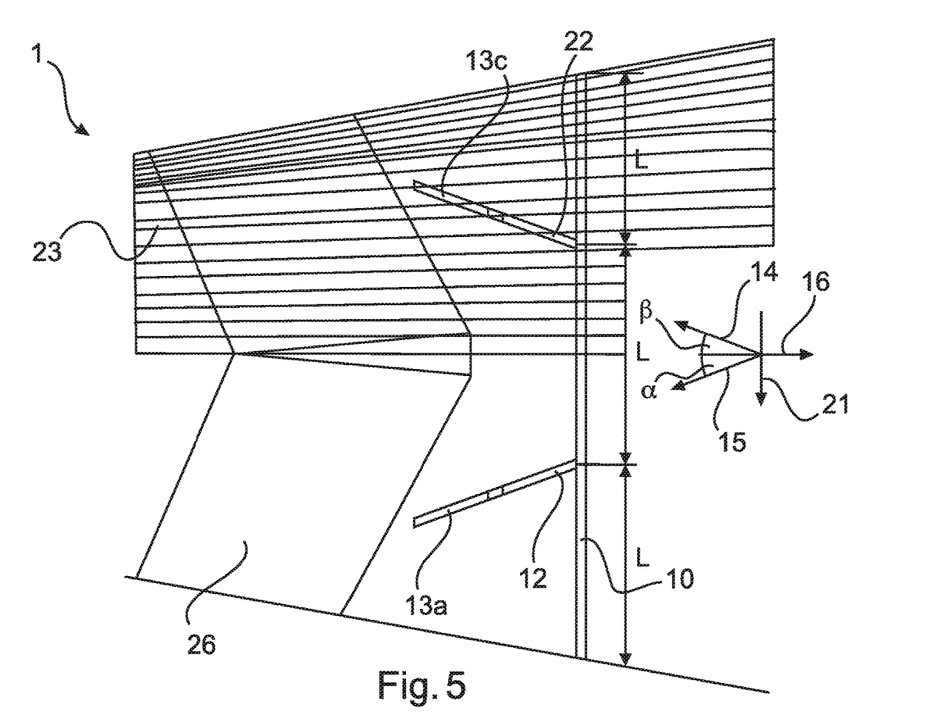
FIG. 5 shows a top view onto a fuselage structure according to an exemplary embodiment.

FIG. 5 shows a top view onto the fuselage structure 1, wherein in particular the direction of extension of the first direction 15 and the second direction 24 of the cantilevers 13a, 13b of the first beam element 12 as well as of the cantilevers 13c, 13d of the second beam element 22 can be seen. In particular, the first cantilever 13a and the second cantilever 13b of the first beam element 12 protrude from the first beam element in the first direction 15. Thereby, the first direction or the two cantilevers 13a, 13b are arranged inclined with reference to the longitudinal direction 16 and referring to the horizontal plane which is spanned by the horizontal direction 21 and the longitudinal direction 16. The same applies with respect to the second direction 24 in which the first cantilever 13c and the second cantilever 13d of the second beam element 22 extend, wherein the second direction 24 is arranged inclined with respect to the longitudinal direction or longitudinal axis 16, too. In particular, the distance between the empennage 26 and the pressure bulkhead 10 may be reduced thereby. At the same time, requirements with respect to stability and mechanical integrity may be assured so that the pressure loads which affect the pressure bulkhead 10 can be introduced effectively into the fuselage structure 1. In other words, the pressure bulkhead 10 which is designed in an even manner can be shifted rearwards with respect to the longitudinal direction 16 as a result of the inclined arrangement of the cantilevers of the first beam element 12 or the second beam element 22 so that the pressure bulkhead has only a very small distance to the empennage 26. This is advantageous with respect to a configuration in which the cantilevers 13a, 13b or 13c, 13d are arranged parallel to the longitudinal direction. Further, in FIG. 5 it can be clearly seen that the first angle α and the second angle β are substantially or exactly the same size. Measurement of the angles α, β takes place with respect to the longitudinal direction 16. Possible connection points or junctions of the two beam elements 12, 22 at the pressure bulkhead 10 may be arranged in the horizontal direction 21 such that the pressure bulkhead 10 of the top view shown in FIG. 5 is separated in three substantially equally sized sections.

Figure 6:
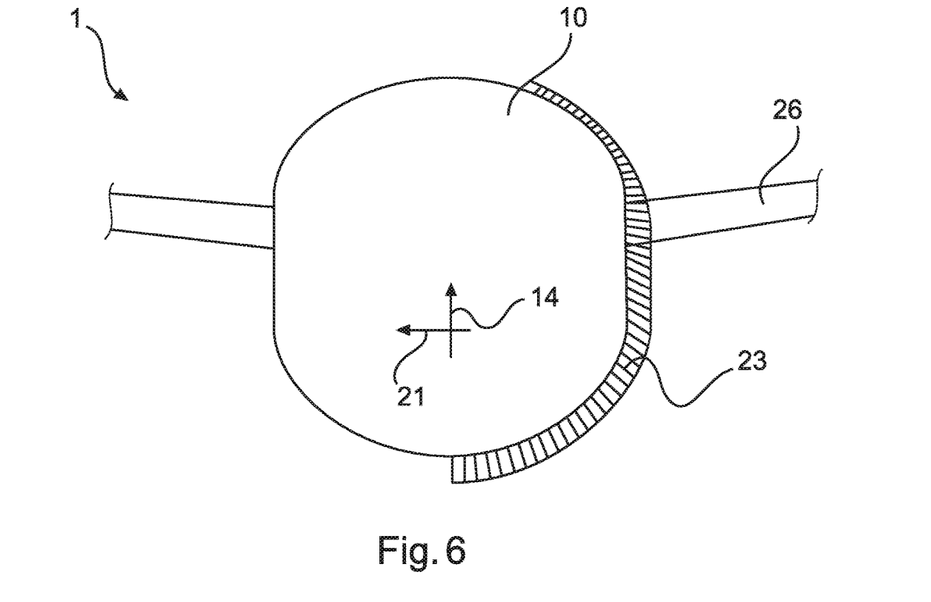
FIG. 6 shows a front view of a fuselage structure according to an exemplary embodiment.

FIG. 6 shows a front view of the fuselage structure 1 with the flat pressure bulkhead 10, wherein the pressure bulkhead 10 lies in a plane which is spanned by the horizontal direction 21 and the vertical direction 14. Thereby, the pressure bulkhead 10 separates particularly two regions of the aircraft which have a different pressure, particularly during an operating state. The viewing direction shown in FIG. 6 is pointed in a direction towards a tail and/or towards the empennage 26 of the aircraft.

Figure 7:
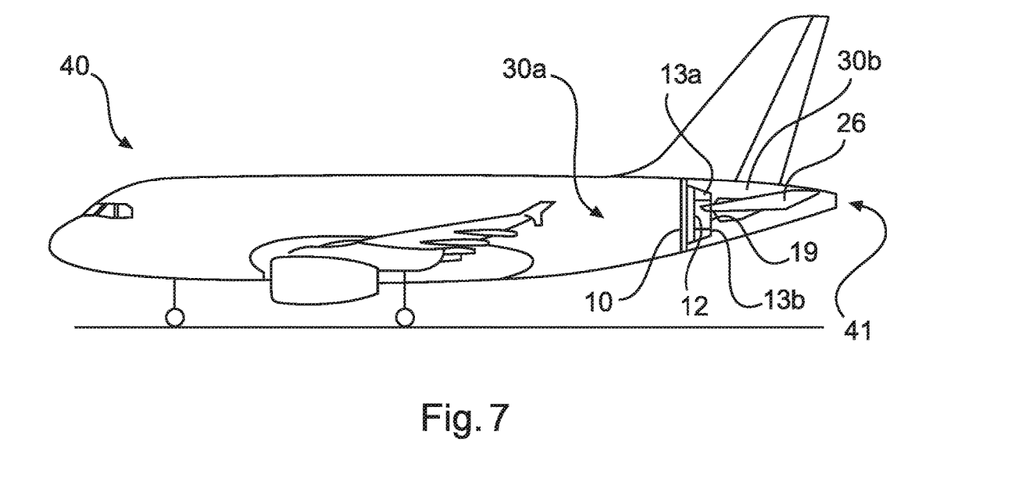
FIG. 7 shows an aircraft with a fuselage structure according to an exemplary embodiment.

FIG. 7 shows an aircraft 40 which comprises the fuselage structure 1. Within the aircraft 40, the flat pressure bulkhead 10 separates two regions 30a, 30b having different pressure. Thereby, the region 30a has a cabin pressure during an operating state of the aircraft 40, for example during flight, which cabin pressure is higher than the ambient pressure in the region 30b. The region 30b is located at a tail 41 of the aircraft 40, for example. FIG. 7 moreover shows how the cantilevers 13a, 13b of the first beam element 12 protrude beyond a front edge of the empennage 26 with respect to the longitudinal direction 16. This is possible as these are respectively aligned in the first direction 15 or the second direction 24 with respect to the longitudinal direction 16 and are, therefore, arranged inclined with respect to the longitudinal direction 16. The beam element 12 is connected with the pressure bulkhead 10, for example by means of the stiffening elements 20 which are not shown in FIG. 7.

Figure 8:
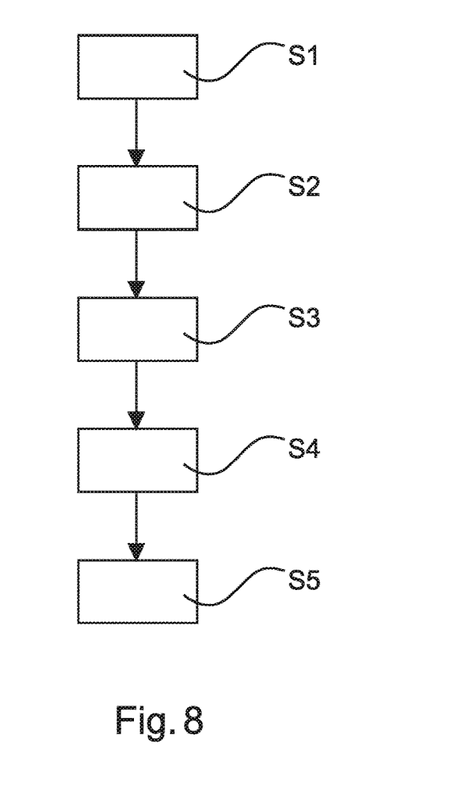
FIG. 8 shows a flow chart for a method for manufacturing a fuselage structure according to an exemplary embodiment.

FIG. 8 shows a flow chart of a method for manufacturing a fuselage structure 1. In a step S1 of the method, provision of an even pressure bulkhead 10 takes place. In a further step S2, arrangement of a frame 11a behind the pressure bulkhead 10 takes place. In a further step S3, provision of a first beam element 12 with a first cantilever 13a and a second cantilever 13b takes place. Furthermore, in a further step S4, arrangement of the first beam element 12 takes place such that this extends in a vertical direction 14 of the fuselage structure 1. In a further step S5 of the method, alignment of the first cantilever 13a and the second cantilever 13b takes place such that both cantilevers 13a, 13b protrude from the first beam element 12 in a first direction 15 towards the frame 11a while the first direction 15 of the two cantilevers is arranged inclined at a first angle α with respect to a longitudinal direction 16 of the fuselage structure 1. In a further step, provision of a second beam element 22 with a first cantilever 13c and a second cantilever 13d may be provided.

Additionally, it is noted that "comprising" does not exclude any other elements or steps and "a" or "an" does not exclude a multitude or plurality. It is further noted that features or steps which are described with reference to one of the above exemplary embodiments may also be used in combination with other features or steps of other exemplary embodiments described above. Reference signs in the claims are not to be construed as a limitation.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A fuselage structure, comprising:
   a pressure bulkhead;
   a frame arranged behind the pressure bulkhead;
   a first beam element with a first cantilever and a second cantilever, the first cantilever extending between the first beam element and a first end in a first direction and the second cantilever extending between the first beam element and a second end in the first direction; and
   a second beam element with a third cantilever and a fourth cantilever, the third cantilever extending between the second beam element and a third end in a second direction and the fourth cantilever extending between the second beam element and a fourth free end in the second direction,
   wherein the first beam element extends in a vertical direction of the fuselage structure,
   wherein the first cantilever and the second cantilever protrude from the first beam element in the first direction towards the frame,
   wherein the first direction of the two cantilevers is arranged inclined at a first angle with respect to a longitudinal direction of the fuselage structure in a top view,
   wherein the second beam element extends in the vertical direction of the fuselage structure,
   wherein the third cantilever and the fourth cantilever protrude from the second beam element in the second direction towards the frame, and
   wherein the second direction of the third and fourth cantilevers is arranged inclined with respect to the longitudinal direction of the fuselage structure at a second angle in a top view.

2. The fuselage structure of claim 1, wherein the first cantilever is arranged at a first end of the first beam element and the second cantilever is arranged at a second end of the first beam element.

3. The fuselage structure of claim 1, wherein the first angle lies in a horizontal plane aligned perpendicular with respect to the vertical direction.

4. The fuselage structure of claim 3, wherein at least one of the first direction and the longitudinal direction lie in the horizontal plane.

5. The fuselage structure of claim 1, wherein the pressure bulkhead has an even shape.

6. The fuselage structure of claim 1, wherein the first cantilever and the second cantilever are interconnected by a connection element spaced apart from the first beam element, the connection element extending in the vertical direction parallel to the first beam element.

7. The fuselage structure of claim 1, wherein further comprising a stiffening element affixed at the pressure bulkhead, the stiffening element extending in a horizontal direction.

8. The fuselage structure of claim 1, further comprising:
a multitude of stiffening elements extending parallel to each other in the horizontal direction on a surface of the pressure bulkhead.

9. The fuselage structure of claim 1, wherein the pressure bulkhead is mounted to the fuselage structure in the region of a frame and separates two regions of different pressure within the fuselage structure from each other.

10. The fuselage structure of claim 1, wherein the second direction of the third and fourth cantilevers of the second beam element and the first direction of the first and second cantilevers of the first beam element lie in a horizontal plane and/or confine an acute angle.

11. The fuselage structure of claim 1, wherein the first angle and the second angle are the same size.

12. An aircraft, comprising:
a fuselage structure comprising:
a pressure bulkhead;
a frame arranged behind the pressure bulkhead; and
a first beam element with a first cantilever and a second cantilever, the first cantilever extending between the first beam element and a first end in a first direction and the second cantilever extending between the first beam element and a second end in the first direction,
wherein the first beam element extends in a vertical direction of the fuselage structure,
wherein the first cantilever and the second cantilever protrude from the first beam element in the first direction towards the frame,
wherein the first direction of the two cantilevers is arranged inclined at a first angle with respect to a longitudinal direction of the fuselage structure in a top view, and
wherein the first cantilever has a vertical extension adjacent to the first beam element and a second vertical extension at the first end, the second vertical extension being smaller than the first vertical extension.

13. The aircraft of claim 12, wherein the first direction of the first and second cantilevers of the first beam element and the longitudinal direction of the fuselage structure run divergent with decreasing distance to a tail of the aircraft.

14. A method for manufacturing a fuselage structure, comprising:
providing a pressure bulkhead;
arranging a frame behind the pressure bulkhead;
providing a first beam element with a first cantilever and a second cantilever, the first cantilever extending between the first beam element and a first end in a first direction and the second cantilever extending between the first beam element and a second end in the first direction;
arranging the first beam element such that the first beam element extends in a vertical direction of the fuselage structure;
aligning the first cantilever and the second cantilever such that the first and second cantilevers protrude from the first beam element in the first direction towards the frame and the first direction of the two cantilevers is arranged inclined with respect to a longitudinal direction of the fuselage structure at a first angle in a top view,
wherein the first cantilever has an upper edge inclined at a second angle with respect to a horizontal plane, in a side view, and a lower edge inclined at a third angle with respect to a horizontal plane, in a side view.

15. The fuselage structure of claim 1, wherein the first cantilever has a vertical extension adjacent to the first beam element and a second vertical extension at the first end, the second vertical extension being smaller than the first vertical extension.

16. The fuselage structure of claim 1, wherein the second cantilever has a third vertical extension adjacent to the first beam element and a fourth vertical extension at the second end, the fourth vertical extension being smaller than the third vertical extension.

17. The fuselage structure of claim 1, wherein the first cantilever has an upper edge inclined at a third angle with respect to a horizontal plane, in a side view, and a lower edge inclined at a fourth angle with respect to a horizontal plane, in a side view.

18. The fuselage structure of claim 1, wherein the second cantilever has an upper edge parallel to a horizontal plane, in a side view, and a lower edge inclined at a fifth angle with respect to a horizontal plane, in a side view.

* * * * *